T. H. WALKER.
MEAT CHOPPER.
APPLICATION FILED APR. 10, 1912.
1,047,346.
Patented Dec. 17, 1912.
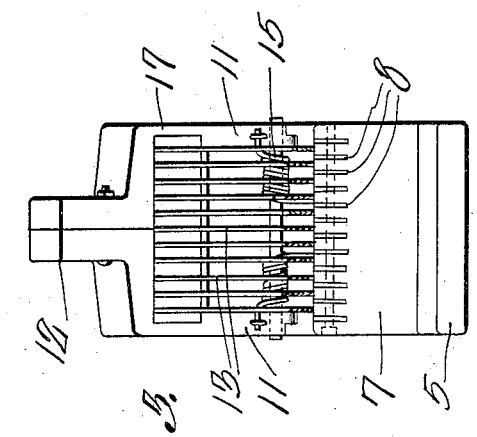
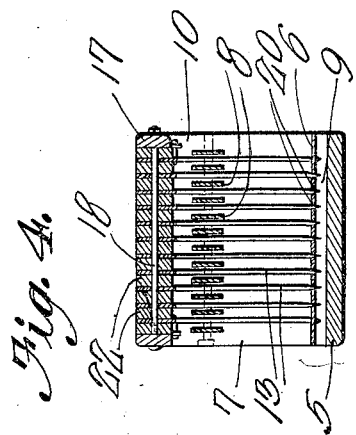
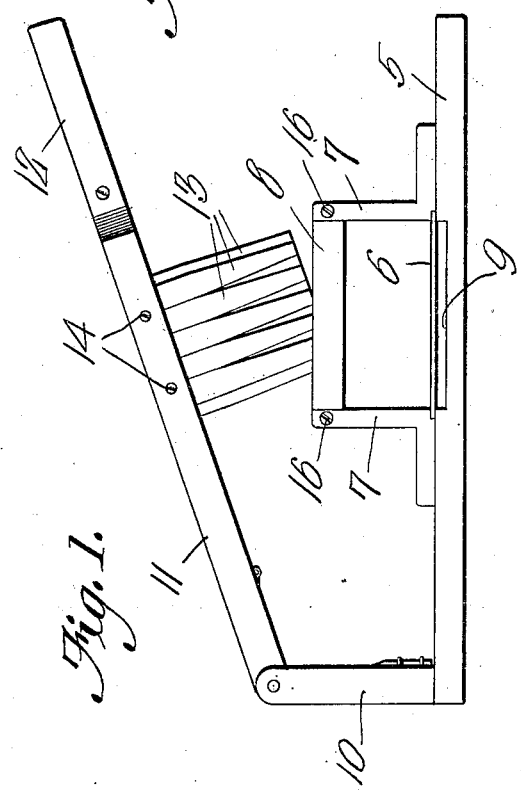
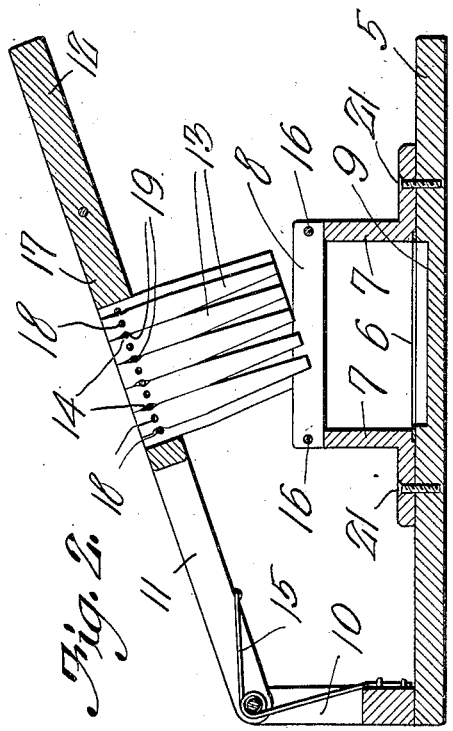
Witnesses
T. H. Walker
Inventor
by C. A. Snow & Co.
Attorneys

UNITED STATES PATENT OFFICE.

TOM H. WALKER, OF THOMASVILLE, GEORGIA, ASSIGNOR OF ONE-HALF TO WALTER E. CRAIGMILES, OF THOMASVILLE, GEORGIA.

MEAT-CHOPPER.

1,047,346.  Specification of Letters Patent.  Patented Dec. 17, 1912.

Application filed April 10, 1912. Serial No. 689,846.

*To all whom it may concern:*

Be it known that I, TOM H. WALKER, a citizen of the United States, residing at Thomasville, in the county of Thomas and State of Georgia, have invented a new and useful Meat-Chopper, of which the following is a specification.

This invention relates to meat choppers or tenderers.

The object of this invention is to provide an improved meat tenderer which will effectually pre-masticate the meat operated on thereby to not only render same more readily digested but to also make the cooking or boiling thereof easier, quicker and more thorough.

Further objects are to provide for details in the construction of the chopper or tenderer which will make it more efficient in use.

With the above and other objects in view this invention is embodied in the novel construction, arrangement and combination of parts as hereinafter described and as illustrated in the accompanying drawings, in which similar reference characters indicate similar parts, and in which, Figure 1 is a side elevation of the meat chopper. Fig. 2 is a longitudinal vertical section thereof. Fig. 3 is an end elevation of the chopper. Fig. 4 is a lateral vertical section showing the relative parts in operative position.

Referring specifically to the drawings, 5 designates a suitable base which has a pair of upstanding standards 10 at one end thereof and an upper recess 9 at the intermediate portion thereof. This base as well as the other parts of the chopper are made of suitable material. Angle iron brackets 7 are arranged at the front and rear of the recess 9 and a plurality of longitudinal bars 8 are embedded in the upper edges of the upright flanges of the brackets 7 in a spaced relation with each other, the said bars having their extremities engaged in slots provided in the edges of the flanges. Bolts 16 are passed through the upright flanges adjacent their edges and pierce the ends of the bars 8, thus removably securing the said bars in position. The other flanges of the brackets 7 are secured to the base 5 by bolts 21 or in any other suitable manner.

A longitudinally split lever 17 in which the knives of the chopper are secured has a pair of projecting arms 11 pivoted to the upper ends of the standards 10 thus swingably mounting or pivoting the lever 17 on the base 5. At its free end the lever 17 is provided with a hand-hold 12. The lever 17 has an opening therethrough between its sections into which the upper ends of a plurality of knives are adapted to be inserted and secured. The knives or teeth are designated at 13 and each knife has a straight upper end, the knives being flat, and in the opposite edges of the upper ends of the knives are arranged notches 19 and an intermediate aperture. The lower end of each knife 13 is tapered and sharpened. These knives are arranged in rows being set edge to edge and the alternate rows are in a staggered position, thus bringing the apertures in the knives of one row into alinement with the adjacent notches of the knives in the adjacent row. Between each of the adjacent rows and at the upper ends of the knives 13 are disposed shim strips 22 which serve to space the respective rows of knives apart. A plurality of pins 18 are passed through the apertures in the upper ends of the knives and the notches therein and which also pierce the shim strips 22 to interlock the various knives in position, two of the intermediate pins being in the form of bolts 14 which are passed through the sections of the lever for holding or clamping the sections together over the knives and for securing the knives to the lever. The knives are thus secured to the lever 17 and by removing the bolts 14 the sections of the lever may be spread apart and the knives may be removed from the said member, and by further removing the respective pins 18 any or all of the knives can be replaced should any of the knives become worn or broken. A wire spring 15 is arranged between the arms 11 and the standards 10 to give an upward tension to the lever 17 therefore normally holding it in raised position.

A plate 6 is arranged over the recess 9 and has a plurality of slots 20 therein through which the lower sharpened ends of the depending knives 13 are arranged to pass upon the lever 17 being depressed. In being swung down the knives 13 pass between the bars 8 for the purpose hereinafter set forth. The knives 13 are of a thickness greater than the widths of the slots 20, and the lower ends of the knives are sharpened so as to enter and seat within the said slots. In this manner, the knives are prevented from passing excessively through the said slots so as to strike the base, and the meat is also more effectively perforated when the lower ends of the knives are seated within the slots, for the reason that the meat is prevented from being forced through the slots ahead of the knives. The flanges of the angle iron brackets which are secured to the base overlap or overlie the corresponding edges of the meat supporting plate in order to retain the said plate in position and permit same to be slid laterally off of the base.

In use, the meat or other matter to be operated upon, is placed on the plate 6 and the lever 17 is depressed by means of the hand-hold 12 thus causing the knives 13 to be pressed downward to numerously perforate or pierce the meat, the lower ends thereof passing through the plate 6. Then upon the lever 17 being released the spring 15 throws same upward to retract the knives 13 above the lower edges of the bars 8, the bars 8 preventing the meat from rising with the knives and thus causing the knives to be withdrawn from the meat, the meat dropping onto the plate 6 either for repeated operation or for removal. If desired the meat can be operated upon several times to cut it into numerous pieces which all hang together in a spongy state. The meat by this treatment is premasticated and the juice and blood is retained therein and the same is sweet, soft and porous, rendering it easy and quick to cut and then readily digestible.

The recess 9 in the base 5 forming a chamber below the plate 6 provides a suitable ventilating means and also protects the edges of the knives from being marred. This plate 6 can be removed for cleansing same, by sliding same laterally of the base 5.

It will be seen that the bars 8 and knives 13 are readily replaced when necessary or desired.

What is claimed is:—

A meat chopper comprising a base, a lever pivoted thereto and having an opening therein, a plurality of teeth arranged in rows and set edge to edge, the alternate rows being in staggered relation and the lower ends of the teeth being tapered, complementing notches being provided in the edges of the teeth at their upper ends and intermediate apertures being provided in the teeth at their upper ends, shim strips disposed between the rows of teeth at their upper ends, and a plurality of pins passing through the respective apertures and complementing notches and piercing the shim strips, the upper ends of the teeth being disposed within the said opening and some of the said pins forming securing members piercing the lever.

In testimony that I claim the foregoing as my own, I have hereto affixed my signature in the presence of two witnesses.

TOM H. WALKER.

Witnesses:
   J. E. CRAIGMILES,
   W. E. CRAIGMILES.

---

Copies of this patent may be obtained for five cents each, by addressing the "Commissioner of Patents, Washington, D. C."